(12) United States Patent
Weber (10) Patent No.: US 12,459,736 B2
(45) Date of Patent: Nov. 4, 2025

(54) RACK SYSTEM INCLUDING RACK-INTEGRATED ESCAPE ROUTE

(71) Applicant: SSI Schäfer Automation GmbH (DE), Giebelstadt (DE)

(72) Inventor: Lukas Weber, Wertheim-Bettingen (DE)

(73) Assignee: SSI Schäfer Automation GmbH (DE), Giebelstadt (DE)

(*) Notice: Subject to any disclaimer, the term of this patent is extended or adjusted under 35 U.S.C. 154(b) by 0 days.

(21) Appl. No.: 18/289,278

(22) PCT Filed: Apr. 27, 2022

(86) PCT No.: PCT/EP2022/061255
§ 371 (c)(1),
(2) Date: Nov. 2, 2023

(87) PCT Pub. No.: WO2022/233681
PCT Pub. Date: Nov. 10, 2022

(65) Prior Publication Data
US 2024/0262619 A1   Aug. 8, 2024

(30) Foreign Application Priority Data

May 4, 2021   (DE) .................. 10 2021 111 497.7

(51) Int. Cl.
*B65G 1/04*   (2006.01)
(52) U.S. Cl.
CPC ........ *B65G 1/0492* (2013.01); *B65G 2207/40* (2013.01)
(58) Field of Classification Search
CPC ..................... B65G 1/0492; B65G 2207/40
See application file for complete search history.

(56) References Cited

U.S. PATENT DOCUMENTS

2012/0185080 A1   7/2012   Cyrulik et al.
2019/0239640 A1*  8/2019   Lert, Jr. ................ B65G 1/026

FOREIGN PATENT DOCUMENTS

DE   2137965 A1    2/1973
DE   19628123 A1   1/1998
(Continued)

OTHER PUBLICATIONS

International Search Report for International Application No. PCT/EP2022/061255, mailed Sep. 1, 2022.
(Continued)

*Primary Examiner* — Saul Rodriguez
*Assistant Examiner* — Willie W Berry, Jr.
(74) *Attorney, Agent, or Firm* — Jason H. Vick; Amped IP LLC (57) ABSTRACT

It is disclosed rack system (10) comprising: at least two rack modules (12) directly adjacent in a height direction (Y) of the rack system (10); wherein the rack modules (12) are formed of two racks (14) being aligned in parallel to each other in a longitudinal direction (X) of the rack system (10) and being spaced apart from each other in transverse direction (Z) of the rack system (10) for defining a rack aisle (16) between them, and comprise a plurality of directly adjacent rack compartments (20); wherein each of the rack modules (12) in the area the rack aisle (16) comprises a maintenance aisle (32) configured for automatically operating and manually maintaining at least one storage and retrieval device (24); and wherein within at least one of the racks (14) a rack-integrated escape channel (26) is provided for connecting the maintenance aisles (32) directly to an outside world of the rack system (10), and wherein the escape channel (26) is configured to be passed by a maintenance technician.

20 Claims, 6 Drawing Sheets

(56) References Cited

FOREIGN PATENT DOCUMENTS

| | | |
|---|---|---|
| DE | 102014003451 A1 | 9/2015 |
| DE | 102015015775 A1 | 6/2017 |
| DE | 102019102804 A1 | 8/2020 |
| EP | 3696116 A1 | 8/2020 |
| WO | WO-2021053544 A1 * 3/2021 ........... B65G 1/0485 |

OTHER PUBLICATIONS

Written Opinion for International Application No. PCT/EP2022/061255, mailed Sep. 1, 2022.
Office Action (Including Translation) for corresponding German Patent Application No. 102021111497.7, mailed Jan. 21, 2022.
International Preliminary Report on Patentability for International Application No. PCT/EP2022/061255, mailed Nov. 16, 2023.

\* cited by examiner

RACK SYSTEM INCLUDING RACK-INTEGRATED ESCAPE ROUTE

CROSS REFERENCE TO RELATED APPLICATIONS

This application is a national stage application under 35 U.S.C. 371 of PCT Application No. PCT/EP2022/061255 having an international filing date of 27 Apr. 2022, which designated the United States, which PCT application claimed the benefit of German Application No. 10 2021 111 497.7, filed 4 May 2021, each of which are incorporated herein by reference in their entirety.

The present disclosure relates to a rack system utilized in intralogistics storage and/or picking systems and comprising an escape route, which can be configured flexibly and according to demand and which complies with operator specifications and/or safety standards applicable.

Figure 7:
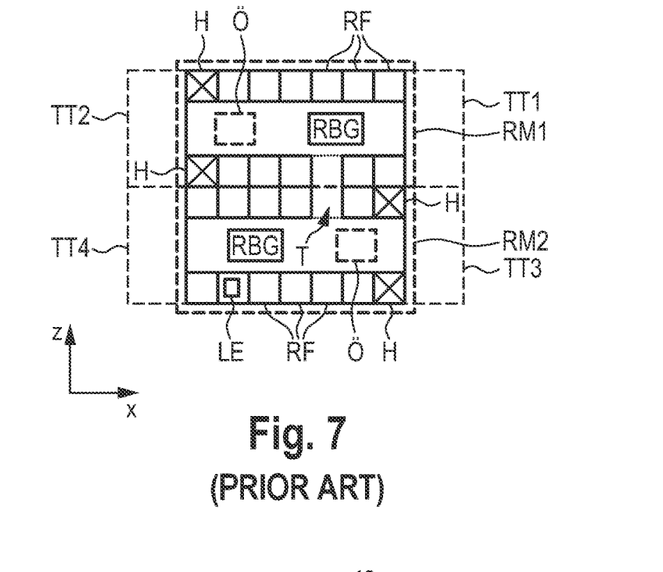
FIG. 7 shows a schematic top view of a conventional rack system.

Conventional rack systems comprise rack modules (RM) being arranged in a height direction Y of the rack system directly adjacent on top of each other and/or in a transverse direction Z of the rack system directly adjacent next to each other, cf. FIG. 7. Further, the conventional rack systems comprise rail-guided storage and retrieval devices (SRD) for automatically storing storage units (SU) into rack compartments (RC) and for retrieving the same from the rack compartments. The rack modules are formed of racks (R) being arranged parallel to each other, wherein racks sections are assigned to each rack module. At least one of the storage and retrieval devices, which is automatically operated in a free space between the racks, i.e. in the rack aisle (RA), is provided to each rack module. Within the rack aisle, each rack module comprises a walkable maintenance aisle so that a maintenance technician at site can inspect and, if necessary, repair the corresponding storage and retrieval device in case of a defect or failure. Whenever maintenance technicians are referred to in the following, this also includes operators entering a maintenance aisle for the purpose of trouble shooting.

Typically, for this purpose the maintenance technician enters the rack aisle, or the maintenance aisle, from one of the two (open) face sides of the rack module where, in this case, correspondingly secured doors are provided. The maintenance aisles of rack modules being arranged higher can be reached via elevators, ladders, or stair towers (ST), arranged at the face side.

Legal regulations (e.g., occupational health and safety legislation), which may differ from country to country, place high demands on escape and rescue routes, which therefore also apply to the maintenance aisles in the rack aisles. In addition to fire protection (see, e.g., MindBauRL), customer and operator requirements may further have to be considered. Also, insurance requirements can play a role.

One possible requirement is that the possibility of escape must be provided within a distance not exceeding 100 m if there are two or more possibilities of escape. If there is one possibility of escape only, the distance may be a maximum of 50 m, which is another requirement (see para. [0004] of DE '775 A1 discussed below).

In conventional rack systems of the type described above, the two face-sided accesses to the rack aisle are two possibilities of escape if no conveyors (lifters) are positioned there. The documents DE 10 2015 015 775 A1 (Gebhardt) and DE 10 2019 102 804 A1 or EP 3 696 116 A1 (Klug) discuss various possibilities of escape in the problematic field of very long rack aisles, which may additionally be blocked by vertical conveyors on one or both face sides.

DE '775 A1 (Gebhardt) assumes that a rack system which (implicitly) has rack-integrated lifters H—but no face-sided rack-external lifters at the entrance and exit of the rack aisle—for vertical transport of the storage units SU. At both ends of this rack system stair towers are provided at the face-sided ends of the rack aisle. FIG. 7 shows a schematic top view of two rack modules (RM1, RM2), which are arranged directly next to each other in the transverse direction Z, of a rack system according to DE '775 A1. Additional rack modules (not shown) are directly adjacent to the illustrated rack modules in the height direction Y.

If the rack aisle is longer than 50 m, DE '775 A1 provides in a central region—when viewed in a longitudinal direction of the rack system—additional passages (openings) in order to enable escape from a maintenance aisle of the rack module, which is to be maintained, into a maintenance aisle of a directly adjacent other rack module. To allow the maintenance technician to escape, for example, to a vertically adjacent rack module, openings (O) including pivotal ladders (not shown) are provided in the floors of the maintenance aisles. Alternatively, if the escape is to be made into a maintenance aisle of a rack module horizontally directly adjacent, which is provided adjacent in the transverse direction Z and at the same height as the rack module to be maintained, a horizontal tunnel, which is formed in a compartmentless manner, i.e. without rack compartments, and which extends in the transverse direction Z of the rack system, is provided through the affected racks of the rack modules involved. In both cases, the maintenance aisle of the vertically, or horizontally, directly adjacent rack module must also be shut down for a potential escape during maintenance, so that automatic operation of the storage and retrieval device is not possible there, which reduces the performance of the rack system in addition to the already failed rack module. Alternatively, emergency shutdowns installed at the passage can be triggered.

DE '804 A1 (Klug) starts from an analogously structured rack system, which additionally comprises at least one face-sided lifter at the entrance or exit of the rack aisle for vertical transport of the storage units and/or the storage and retrieval devices (roaming). This rack-external lifter extends across the total height of the rack aisle and is directly adjacent to the rack aisle, so that an escape via this end of the rack aisle is not possible. The access to the maintenance aisles is via the lifterless (face) side of the aisle. To ensure that the escape is also possible via the lifter-blocked side, DE '804 A1 proposes to provide at the level of the maintenance aisle a pivotably and slidably supported bridge, which allows the maintenance technician in case of an escape to cross the shaft of the face-sided lifter horizontally in the longitudinal direction X of the rack system without falling, and to escape an external stair tower provided there, or an escape ladder attached to the outside of the rack. In normal position the bridge does not block the lifter. In this manner an additional escape route is also provided solving the problem that exists when the maintenance aisle does not exceed a permissible maximum escape-route length (e.g., a maximum of only 50 m). If the maintenance aisle is longer, even the bridge on its own cannot solve the problem of at least one escape route being reachable within the permissible maximum distance (e.g., at a distance of 50 m) because the defective storage and retrieval device blocks one of the two escape routes. In this case, additional escape routes are required. DE '804 A1 does not provide a solution for this problem.

The problem described for DE '804 A1 is further aggravated if rack-high lifters are provided at both sides of the rack aisle, because in this case the maintenance aisles are not accessible from the face side.

Therefore, it is an object of the present disclosure to provide a rack system providing possibilities of escape according to demand. In particular, the locally valid rules and legal regulations as well as further wishes of the customer (system operator) are to be observed. Furthermore, it is desirable not to have to turn-off an automatic operation of directly adjacent rack modules during maintenance. The solution should be independent of whether or not the rack system provides for external lifters at one or both ends of the rack aisle. Also, the total length of the rack aisle should be irrelevant so that even very long rack aisles with lengths far in access of permissible maximum escape-route lengths (e.g. 50 m) can be provided with sufficient possibilities of escape.

This object is solved by a rack system comprising: at least two rack modules directly adjacent in a height direction (and/or transverse direction) of the rack system; wherein the rack modules are formed of at least two racks, two racks of which are arranged in a longitudinal direction of the rack system parallel to each other and are spaced apart from each other in a transverse direction of the rack system for defining, in this way, a rack aisle between them, and comprise a plurality of rack compartments being directly adjacent (in the longitudinal direction, and if necessary also in the height direction); wherein each of the rack modules comprises a maintenance aisle in the area of the rack aisle, which is configured for automatically operating and manually maintaining at least one storage and retrieval device; and wherein, within at least one of the racks, a rack-integrated, preferably compartmentless, escape channel is provided for connecting the maintenance aisles directly to the outside world of the rack system, so that in case of an escape no other maintenance aisle must be used, and wherein the escape channel is configured to be passed by a maintenance technician.

The rack system of the present disclosure can avoid shutting down adjacent rack modules during maintenance, because, in the event of an escape, the maintenance technician does not have to use any of the other maintenance aisles immediately adjacent to the maintenance aisle in which the defective or failed storage and retrieval device is located. The maintenance technician escapes exclusively through the rack by moving along the rack-integrated escape channel. The escape channel extends exclusively through the rack to an exit connected to the outside world of the rack system. A course of the escape channel is selectable freely in the vertical direction and horizontal direction. The number of escape channels is selectable freely.

If the ends of the rack aisle are blocked—as escape routes—by (stationary) lifters, one or more escape channels (dependent on the total length of the rack aisle) are provided within the racks limiting the affected maintenance aisle laterally and in the height direction. These escape channels can be distributed arbitrarily over the length of the rack aisle as well as over the two adjacent racks, so that at least one possibility of escape, which is spaced less than a permissible maximum escape-route length (e.g., 50 m) from the location of the failed storage and retrieval device or a malfunction location, is always given, and independently of the location of the failed storage and retrieval device.

The escape channel is integrated directly into a rack structure—omitting rack compartments, which are normally provided. Outside the rack system an additional stair tower is not required, which can reduce the requirements on the statics of the rack structure as well as the investment costs and space requirement.

Thus, the possibilities of escape can be scaled arbitrarily—independent of a rack-aisle length as well as of a number of and positioning location of lifters.

The escape takes place in an area of the rack system, where no machines such as storage and retrieval devices and/or lifters are moved, so that risk of collision and injury for the maintenance technician is excluded.

Due to a clever relative positioning and distribution of the escape channels the loss of the rack compartments, which are provided there otherwise, is of little significance in terms of storage capacity. Nowadays, the rack systems are very long (aisle length >100 m) and very high (>12 m), so that the omission of the corresponding rack compartments for the escape channel(s) is disproportionate to the additional expense of an external stair tower and/or adjacent rack modules turned-off.

Preferably, the escape channel includes an escape shaft extending in the height direction through the at least one of the racks and connecting to each other the rack modules in the height direction in a compartmentless manner.

In this case, the escape takes place substantially in the vertical direction over several rack modules through rack, e.g., via a step ladder. The height of the rack system does not play any role. The required statics is provided by the rack system itself.

Preferably, the escape channel is defined by the escape shaft only, which is arranged at a longitudinal end of the at least one of the racks and connected directly to the outside world at an escape level in the longitudinal direction or transverse direction.

When the escape channel is arranged at a face-sided end of the racks, the escaping maintenance technician does not need to pass a route in the longitudinal direction through the racks for reaching the outside world. Few rack compartments are lost.

The escaping maintenance technician just climbs vertically through the racks to the height of the escape level which is typically arranged on the floor of the rack system.

Alternatively, the escape shaft can be arranged remote to a longitudinal end of the at least one of the racks.

The positioning of the escape channel, or several escape channels, between the longitudinal end of the rack is required for rack aisles being longer than a permissible maximum escape-route length (e.g. 50 m). In this case, the escape shaft(s) can be positioned so that they are always less away from a damaged storage and retrieval device than a permissible maximum escape-route length, in particular 50 m.

Preferably, in this case the escape channel(s) are defined by escape shafts only, which are connected directly, at the escape level, to the outside world in the transverse direction. Otherwise, the escape channel(s) further include at least one escape aisle extending, at the escape level, to the outside world and connecting the escape channel(s) in the longitudinal direction to the outside world.

In the first case, the escape channel is connected to an outer longitudinal side of the rack system if additional racks do not block the route to the outside world there. This means that this solution is advantageous, in particular, for rack systems being provided in an isolated manner, where the rack modules are arranged on top of each other only, in order to lose as few rack compartments as possible to the escape channel.

In the second case, where an escape aisle is coupled to the escape channel at the escape level, the rack compartments, which are additionally lost there, are deliberately accepted for allowing to position further rack systems, or rack modules, in the transverse direction directly adjacent to the affected rack system. In the second case, the (final) escape takes place exclusively in the longitudinal direction, because the transverse direction is blocked by directly adjacent rack systems.

Alternatively, the escape channel, in the at least one of the racks, includes escape aisles only, which extend in the longitudinal direction and connect the respective maintenance aisle to the outside world.

In this case, the escaping maintenance technician is not required to climb vertically through the rack. Thereby, risk of falling within the rack is reduced. The safety requirements can be met more easily outside the rack, e.g., by an external stair tower or a fire ladder.

Preferably, in this case the rack system further includes the stair tower or the fire ladder, which is coupled in the longitudinal direction either directly, or indirectly via a connecting bridge, to the at least one of the racks, so that each of the escape aisles (in the height direction) is connected (in the outside world) to the predetermined escape level.

In a further preferred embodiment the at least one storage and retrieval device includes a plurality of shuttles (one-level or multi-level storage and retrieval devices), which are movable in a guided manner along rails in the longitudinal direction, wherein the rails in the maintenance aisle are attached to the rack compartments in the height direction on top of each other and in the transverse direction at both sides, and extend in the longitudinal direction, and wherein the escape channel is connected to the respective maintenance aisle via a door including subsections of the rails.

The rails typically prevent an escape in the transverse direction from the maintenance aisle, even if no rack compartments are provided there within the rack. The door is provided with subsections of the rails so that the door can be passed by the shuttles in a closed state. In the open state the door provides the maintenance technician with access to the escape channel.

The door can be monitored in terms of safety for causing an emergency shutdown of the storage and retrieval devices if the door is open (unintentionally and unannounced). The door can be locked to prevent it from opening unintentionally during automatic operation of a storage and retrieval device.

Preferably, the door consists of the subsections only which can be manually inserted removably (e.g., form-fitted) into the end pieces of the respective remaining rails.

The opening and closing of the "door" in this case does involve more effort for the maintenance technician. However, in this case the rail sections do not have to be movably supported, so that the door is technically designed simpler and costs less.

Alternatively, the door is supported slidably (substantially) in the longitudinal direction.

In this case, the door can be moved, e.g., by light pressure into the rack in order to be pushed laterally aside in the longitudinal direction for providing access to the entrance of the escape channel. Also in this case, the door allows passage of shuttles in the closed state and passage of the maintenance technician in the open state.

As a further alternative the door can be supported rotatably about a pivot axis extending along the height direction (or longitudinal direction).

In particular, the door can be locked in a closed state in which the shuttles can pass the door unimpeded.

The locking mechanism prevents the door from opening by itself (unintentionally) which would lead to damage by, and/or to, the passing shuttles.

A sensor can be provided further, which monitors a position of the door and outputs a signal to the safety controller when the door is in an open position, wherein the safety controller is configured to deactivate the shuttles in the maintenance aisle as soon as the signal is received.

In this manner it is ensured that the shuttles are not automatically operable while the maintenance technician is within the maintenance aisle.

Preferably, the rack aisle is longer than a permissible maximum escape-route length, in particular 50 m.

An additional escape route within the rack can be formed by the escape channel, without the need of shutting down neighboring rack modules.

In particular, a rack-external lifter is provided directly at one end, or respectively at both ends, of the rack aisle so that storage units and/or the at least one storage and retrieval device can be transported in the height direction between the rack modules.

Although the entrances, which are normally open, of the rack aisles are blocked by the rack-external lifter(s), a (further) escape route can be provided via the rack-integrated escape channel, wherein in particular neighboring rack modules do not need to be shut down during the maintenance. Nevertheless, the lifter(s) at the end of the aisle can transport storage units and/or storage and retrieval devices in the height direction. Circulating roaming of storage and retrieval devices is thus possible, as described in EP 2 683 629 B1.

Further, the rack-external lifters are still freely accessible from the outside, which clearly facilitates maintenance of the rack-external lifters.

Alternatively or additionally, at least one rack-integrated lifter is provided in one or both of the racks.

If no rack-external lifters exist beside the rack-integrated lifter, the (additional) escape channel—besides the conventional escape routes at the entrance and exit of the rack aisle—can meet the given requirements in case of very long aisle lengths.

Preferably, the rack system further includes the at least one storage and retrieval device.

It is understood that the above features and the features still to be explained hereinafter cannot be used in the respectively indicated combination only but also in other combinations or in a stand-alone position without departing from the scope of the present invention.

Exemplary embodiments of the invention are shown in the drawings and will be explained in more detail in the following description.

Figure 1A:
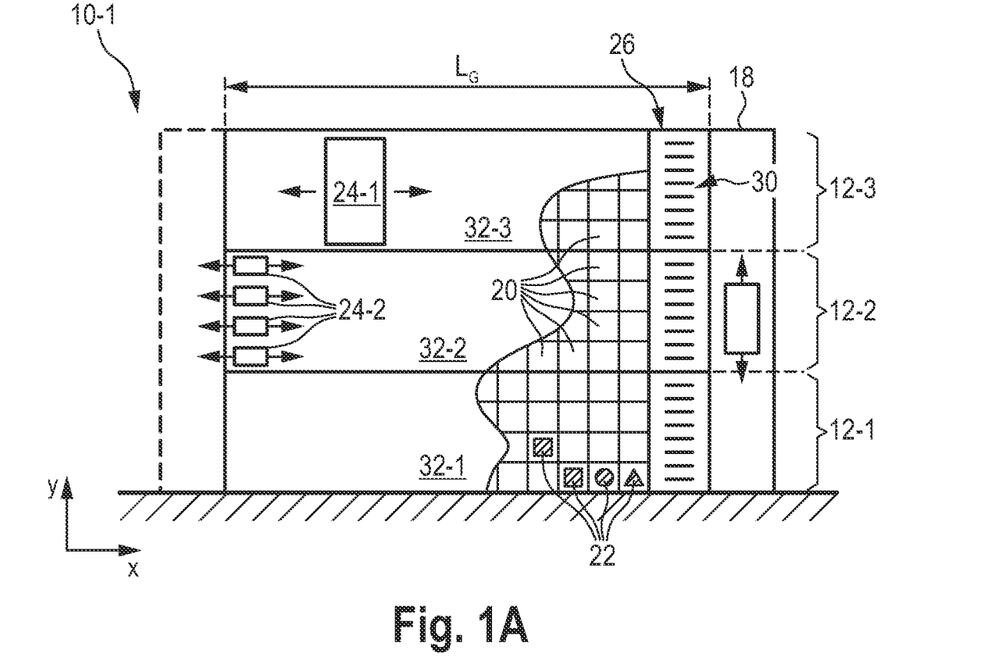
Figure 1B:
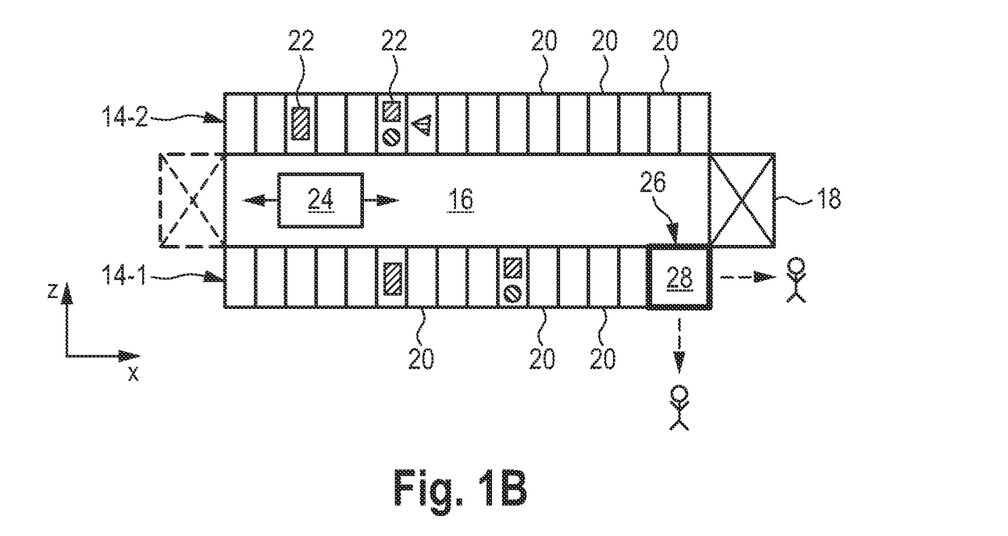
Figure 2A:
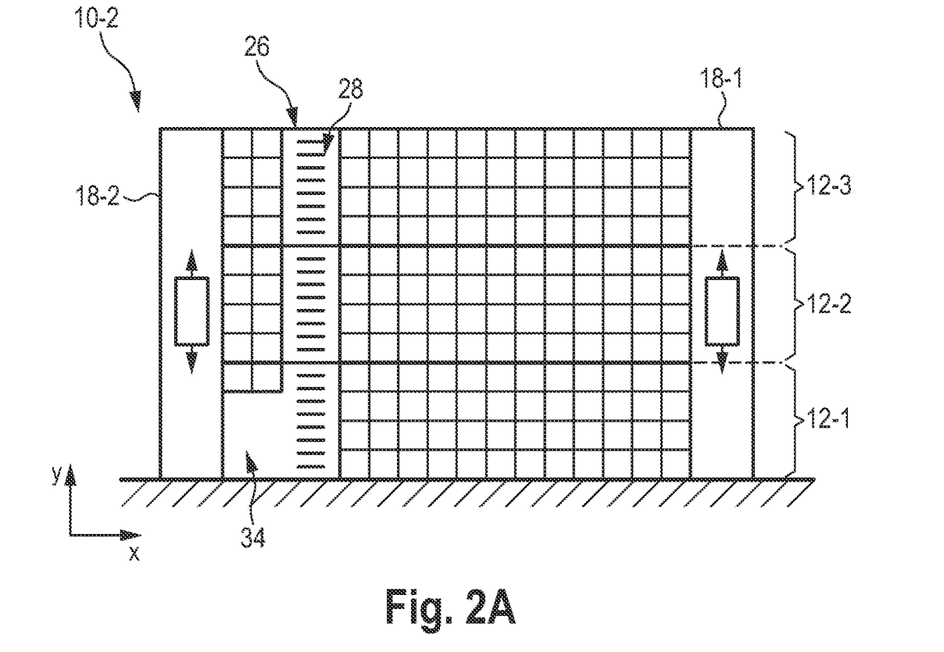
Figure 2B:
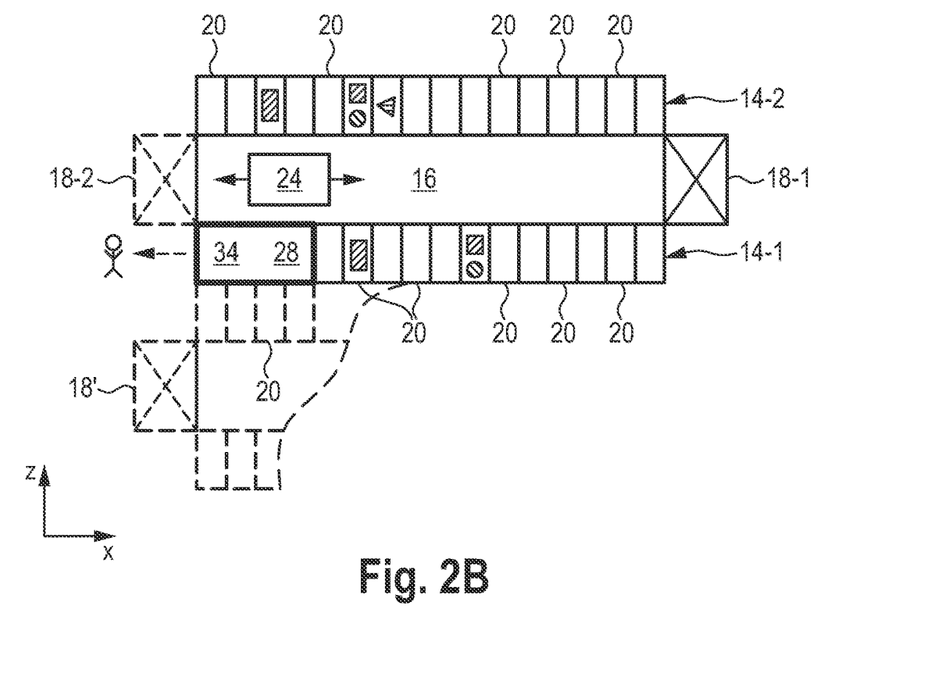
Figure 3A:
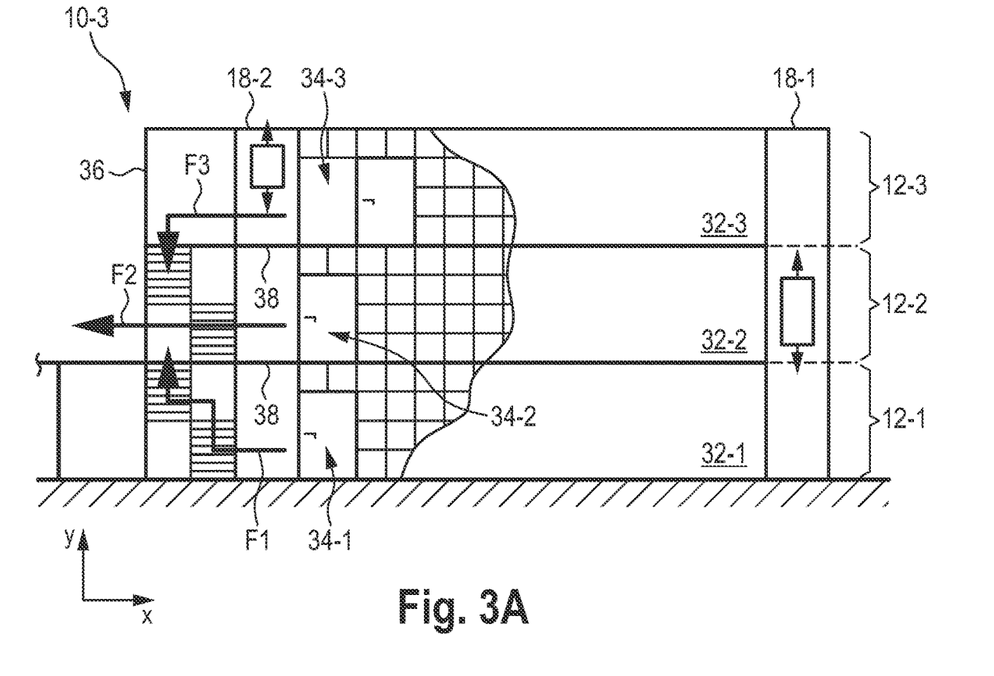
Figure 3B:
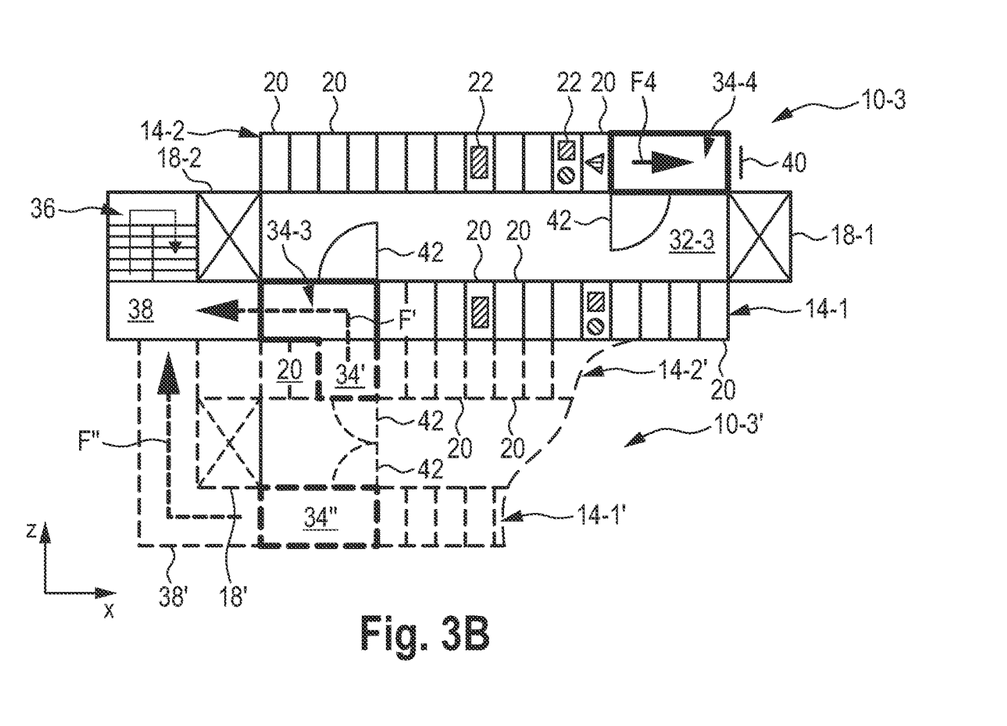

FIG. 1 shows a side view (FIG. 1A) and a top view (FIG. 1B) of a first embodiment of a rack system;

FIG. 2 shows a side view (FIG. 2A) and a top view (FIG. 2B) of a second embodiment of a rack system;

FIG. 3 shows a side view (FIG. 3A) and a top view (FIG. 3B) of a third embodiment of a rack system;

FIGS. 1 to 3 show three different exemplary embodiments of a rack system 10.

The rack system 10 suggested here is generally used in an intralogistics storage and/or picking system, such as a distribution center.

Intralogistics comprise logistical flow of materials and goods within a company premises, in particular within a company building. The term intralogistics was defined to create a distinction from the transport of goods outside the company, which is carried out by shipping company, for example. The "Forum Intralogistik" in the "Verband Deutscher Maschinen- und Anlagenbauer" defines intralogistics as the organization, control, implementation and optimization of the internal flow of goods and materials, of the flow of information as well as of handling of goods in industry, commerce, or public institutions.

The term picking refers to the compilation of a customer-specific quantity of requirement from an assortment of several article types. Thus, picking describes a picking compilation for a customer order, i.e. removal of sub quantities of larger units of individual articles and combination and provision thereof for shipment to the customer.

The rack system 10 can be used in a storage system as well in an order-picking system.

FIG. 1A shows a side view of a first embodiment 10-1 of a rack system 10. FIG. 1B shows a top view of the rack system 10-1 of FIG. 1A.

The rack system 10-1 of FIG. 1 comprises, for example, three rack modules 12-1 to 12-3 being arranged vertically on top of each other in the height direction Y. It is understood that, in general, more or less rack modules 12 can be provided. However, at least two rack modules 12 are provided, which are directly adjacent to each other in the height direction Y of the rack systems 10.

Each of the rack modules 12-1 to 12-3 is formed of (parts or portions of) two racks 14-1 and 14-2 (cf. FIG. 1B). The racks 14-1 and 14-2 are aligned and arranged parallel to each other in the longitudinal direction X of the rack system 10, as well as are arranged spaced to each other in the transverse direction Z of the rack system 10 in order to define, in this way, a rack aisle 16 between them. Thus, the rack aisle 16 is the (free) space between the two racks 14-1 and 14-2. The rack aisle 16 extends in the longitudinal direction X from a first longitudinal end to the opposite second longitudinal end where a (rack-external) lifter 18 is positioned, for example. It is understood that also at the first longitudinal end of the rack aisle 16 another lifter 18 may be positioned, which is indicated in FIG. 1B by dashed lines.

In general, a lifter 18 means a stationary vertical conveyor.

Each of the racks 14-1 and 14-2 comprises a plurality of rack compartments 20, which are directly adjacent to each other in the example of FIG. 1 in the longitudinal direction X and in the height direction Y. The rack compartments 20 are generally configured to receive one or more storage units 22 (in the direction Z one behind the other). The rack compartments 20 can have different dimensions. However, the rack compartments 20 are preferably defined with identical dimensions. The rack compartments 20 are configured to receive the storage units 22 in a sitting (shelves or angles) or hanging (lateral angles) manner. The storage units 22 are stored and retrieved, in general automatically, by the storage and retrieval devices 24.

Two different types of storage and retrieval devices 24 are exemplarily shown for illustration purposes in FIG. 1A. Typically, only one type is used. One (single) multiple-level storage and retrieval device 24-1, which can operate four rack levels arranged on top of each other, is assigned to the rack module 12-3. For example, four one-level storage and retrieval devices 24-2 are assigned to the rack module 12-2, which can respectively operate only one of the four rack levels (not designated in more detail). Different types of storage and retrieval devices 24 can be used. It is understood that even more or less rack levels can be provided for each rack module.

Further, the rack system 10-1 of FIG. 1 includes one, exemplarily single, escape channel 26. The escape channel 26 is formed in a rack-integrated manner. This means that the escape channel 26 extends exclusively within the rack 14. In the area of the escape channel 26 the rack 14 is formed in a compartmentless manner. This means that no rack compartments 20 are provided in the area of the escape channel 26.

The escape channel 26 is defined, in FIG. 1, exclusively by a (vertical) escape shaft 28 positioned preferably at the longitudinal end of the first rack 14-1 in immediate vicinity of the rack-external lifter 18. The escape shaft 28 of FIG. 1 extends in the height direction Y across each of the three rack modules 12-1 to 12-3. The escape shaft 28 is provided internally with a ladder 30 so that a maintenance technician (not shown), who is located in the upper rack modules 12-2 and 12-3, can descent to ground level (escape level) for exiting the escape channel 26 either in the longitudinal direction X and/or in the transverse direction Z towards an outside world of the rack system 10, as indicated in FIG. 1B by means of dash-dotted arrows. The escape channel 26 is, besides the open first longitudinal end of the rack aisle 16, a second possibility of escape (escape route).

It is understood that the storage and retrieval device(s) 24 of each rack module 12 may fail at any point within the rack aisle 16. Therefore, a maintenance aisle 32 is provided within the rack aisle 16 in the example of FIG. 1 for each of the rack modules 12-1 to 12-3. Preferably, each of the rack modules 12-1 to 12-3 is provided with walk-on (e.g., grid-like) panels in its floor area so that the maintenance technician can walk, in the maintenance aisle 32, from each rack module 12 to the defective or failed storage and retrieval device 24 and also repair the storage and retrieval device 24 there. Dependent on the location of the failed storage and retrieval device 24 within the associated maintenance aisle 32, the maintenance technician in FIG. 1 can enter the corresponding maintenance aisle 32 either from the open side of the rack aisle 16 or via the escape channel 26.

Due to the requirements discussed in the introduction, the first embodiment of the rack system 10-1 is particularly suitable for short rack aisles 16 having an overall length LG shorter than or equal to the permissible maximum escape-route length, e.g. ≤50 m, because another possibility of escape is created in the immediate vicinity of the blocked end of aisle.

It is understood that the escape channel 26, or the escape shaft 28, may also be positioned at a different location in the longitudinal direction X within the corresponding rack 14. In this case, the escape channel 26 is accessible at the escape level, however, only in the transverse direction Z if an additional (horizontal) escape aisle 34 (cf. FIG. 2) is not provided.

Additionally, it is understood that a further lifter 18 may also be provided at the first longitudinal end so that the rack aisle 16, or the maintenance aisles 32-1 to 32-3 of FIG. 1, can be accessed via the escape channel 26 only.

Also, it is understood that in each of the racks 14-1 and 14-2 one or more escape channels 26 can be provided at the same time.

FIG. 2 shows an exemplary second embodiment of a rack system 10-2, wherein FIG. 2A shows a side view and FIG. 2B shows a top view of the rack system 10-2 of FIG. 2A.

The rack system 10-2 of FIG. 2 is structured almost identical to the rack system 10-1 of FIG. 1. Therefore, substantially a closer look at the differences will be taken in the following.

The rack system 10-2 of FIG. 2 in turn comprises, for example, three rack modules 12-1 to 12-3 vertically directly adjacent to each other. The rack modules 12-1 to 12-3 again are formed by the two racks 14-1 and 14-2, which in turn define the rack aisle 16 between them.

A further lifter 18-2 is positioned at the first longitudinal end of the aisle 16, additionally to the rack-external lifter 18-1 at the second longitudinal end of the aisle 16. The lifters 18 extend across the entire height of the rack system 10-2. Therefore, the rack aisle 16 and the maintenance aisles 32-1 to 32-3 cannot be accessed via the aisle 16. The maintenance aisles 32-1 to 32-3 are accessible via the escape channel(s) 26 only.

For example, the escape channel 26 is again arranged in the first rack 14-1. However, the escape channel 26 of FIG. 2 is composed of an escape shaft 28 and an escape aisle 34, deviating from the escape channel 26 of FIG. 1.

The escape shaft 28 of FIG. 2 extends in the vertical direction Y through each of the rack modules 12-1 to 12-3 to the floor of the rack system 10-2 where the escape level is arranged. The escape aisle 34 extends in the longitudinal direction X from the escape shaft 28 through the rack 14-1 to the outside (outside world) of the rack 14-1. The (horizontal) escape aisle 34 extends in the height direction Y, for example, across one or more rack compartments 20.

Height and width of the escape aisle 34 are generally selected such that the maintenance technician can traverse the escape aisle 34 without any collision, even when being in a hurry. If the rack compartments 20 are configured to store the storage units 22 multiple deep, only a rear part of the affected rack compartments 20 can be omitted for also creating space for the escape aisle 34 so that the affected rack compartments 20 can still be served by the storage and retrieval device 24 via the rack aisle 16.

Similar is true for the escape shaft 28. The escape shaft 28 is dimensioned for an escape and replaces a plurality of storage compartments 20 in the height direction Y. Also in this case of a multiple-deep storage in the rack compartments 20, it is possible that some of the affected rack compartments 20 are omitted only partially in a rear area. It is understood that the access to the escape shaft 28 in the floor area of the respective maintenance aisle 32 must be ensured so that the affected rack compartments 20 are completely omitted there. Further, it is understood that the escape shaft 28 in the highest rack module 12, here in the rack module 12-3, does not to extend all the way to the top (not shown in FIG. 2A) so that rack compartments 20 may continue to also remain there for normal use by the storage and retrieval device 24.

The rack system 10-2 of FIG. 2 further illustrates that the escape channel 26 can be generally positioned along the longitudinal direction X at any arbitrary position within the affected rack 14.

In particular, the embodiment of FIG. 2 is suitable for storage and/or order-picking systems where several ones of the rack systems 10-2 are arranged in the transverse direction Z next to each other and directly adjacent to each other. In this case, an escape in the transverse direction Z from the rack system 10-2 is not possible so that the maintenance technician may escape exclusively in the longitudinal direction X from the affected rack system 10-2.

Further, it is understood that the L-shape of the escape channel 26, which is indicated in the side view of FIG. 2A, may also be formed in a stair-like manner (not shown). In this case, the escape channel 26 would be divided, for example, into three vertical sections being shifted in the longitudinal direction X relative to each other for each rack module 12 and which may be connected to each other via a corresponding escape aisle 34 (not shown) within the affected rack 14.

With other words, a course of the escape channel 26 through the affected rack 14 can be arbitrarily configured of shaft components and of aisle components and according to demand, which facilitates the design of the rack system 10 because the escape routes no longer have any influence.

Further, it is generally possible to connect to each other several escape channels 26 being provided in the same rack 14 and extending substantially in the height direction Y through the corresponding rack 14 via one or more (horizontal) escape aisles 34. It is understood that the more escape shafts 28 and escape aisles 34 are provided, the more rack compartments 20 are lost. However, this (supposed) reduction in storage capacity is compensated for by the required design of the rack system in terms of adequate possibilities of escape.

FIG. 3 shows a third exemplary embodiment of a rack system 10-3. The rack system 10-3 of FIG. 3 differs from the rack systems 10-1 and 10-2 of FIGS. 1 and 2 substantially in that the escape channel 26 is formed exclusively by (horizontal) escape aisles 34.

Each of the maintenance aisles 32-1 to 32-3 is respectively connected to the escape aisle 34. The escape aisles 34-1 and 34-2 of the rack modules 12-1 and 12-2 are arranged directly at the longitudinal end of the first rack 14-1, and therefore are shorter than the escape aisle 34-3 of the third rack module 12-3 arranged somewhat remote to the longitudinal end of the rack 14-1.

All of the three escape aisles 34-1 to 34-3 of FIG. 3 lead out of the rack system 10-3, or out of the rack 14-1, in the longitudinal direction X. Escape shafts 28 do not exist. Nevertheless, in order to allow the escape in the vertical direction Y towards the escape level, which is exemplarily arranged at the central height of the second maintenance aisle 32-2, a stair tower 36 is provided outside the rack system 10-3. The stair tower 36 connects to the rack system 10-3 from the outside. The stair tower 36 connects to the lifter 18-2 in the longitudinal direction X. The first rack 14-1 is coupled to the stair tower 36 via a connecting bridge 38. The (horizontal) connecting bridge 38 can be configured arbitrarily with respect to a course in order to connect the escape aisles 34 to the stair tower 36.

It is understood that the stair tower 36 can be replaced, in general, even by an escape ladder 40, a passenger elevator, or the like attached directly to the longitudinal end of the racks 14, or to the lifter 18, so that the stair tower 36 and the connecting bridges 38 may be omitted.

The third embodiment, which does not require escape shafts 28, is particularly suitable for rack arrangements where several rack systems 10 are arranged in the transverse direction Z next to each other and directly adjacent to each other, as indicated in FIG. 3B by means of dashed lines. In FIG. 3B a further (optional) rack system 10-3' is shown beside the rack system 10-3. The rack system 10-3' comprises additional escape aisles 34' and 34". The escape aisle 34' extends in the upper rack module 12-3' in the transverse direction Z through the second rack 14" and connects internally to the rack 14-1 of the rack system 10-3 so that an additional escape route F' is defined, which is illustrated by a dashed line in FIG. 3B. In this case, the maintenance technician escapes into another rack module, automatic operation of which, however, does not need to be turned off, because the maintenance technician does not move in the rack aisle 16 when escaping.

In the rack 14-1 of the rack system 10-3' still a further (optional) escape aisle 34-2' is shown, which extends substantially in the longitudinal direction X through the rack 14-1' to the outside world for defining an additional escape route F", which includes an additional connecting bridge 38'. The additional connecting bridge 38' extends around the lifter 18' of the rack system 10-3' and connects to the connecting bridge 38 of the rack system 10-3 for being coupled indirectly to the stair tower 36.

With regard to the additional escape aisles 34' and 34" it has to be taken into account that the associated escape routes F' and F'" again lead directly to the outside world, i.e. do not use another maintenance aisle 32 for the escape.

Further, it is understood that even in the third embodiment further optional escape channels 26 may be provided in the other racks 14. In FIG. 3B one further escape aisle 34-4 is shown, which is arranged in the second rack 14-2 of the rack system 10-3 and defines a further escape route F4 to the longitudinal end of the rack 14-2 where the lifter 18-1 is arranged. The escape route F4 connects to a (fire) ladder 40, which is attached to the outside of the rack 14-2 and which may reach to the floor.

Furthermore, in FIG. 3B optional doors 42 and 42' are shown, which connect the escape channels 26, and/or escape aisles 34, to the associated maintenance aisles 32. The doors 42 will be explained hereinafter in more detail. The doors 42 of FIG. 3B exemplarily open into the associated maintenance aisle 32. In the open position, the doors 42 block any movement of the storage and retrieval devices 24 (not shown). The doors 42 are configured such that the doors 42 allow passage of the storage and retrieval devices 24 in the closed state. This is true independent of whether a one-level storage and retrieval device or a multiple-level storage and retrieval device 24 is concerned.

Figure 4:
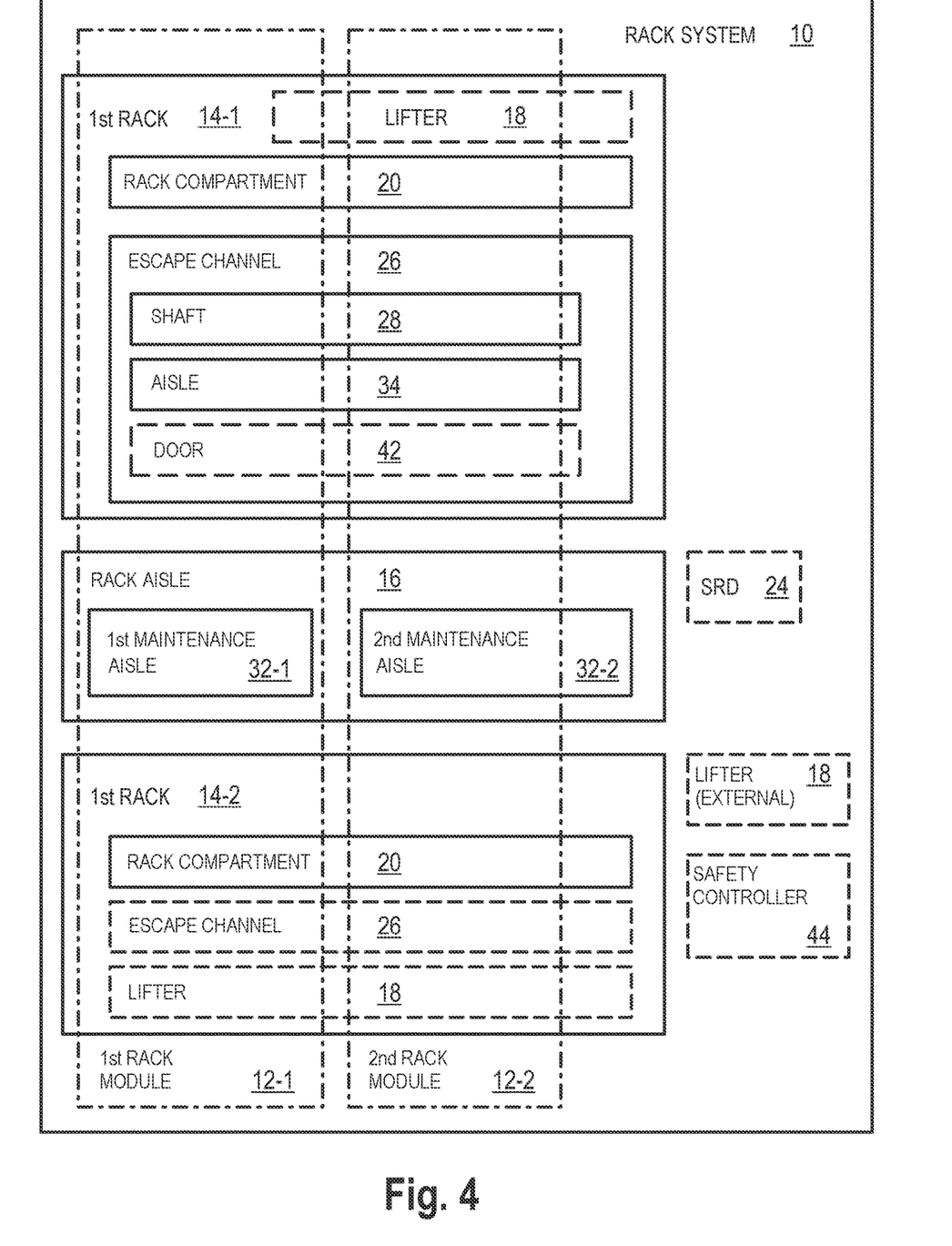
FIG. 4 shows a block diagram of a rack system.

FIG. 4 is a schematic block diagram of the rack system 10 for illustrating the general structure of the rack system 10. FIG. 4 in particular illustrates a "smallest unit" of the rack system 10.

The rack system 10 comprises at least two rack modules 12-1 and 12-2 directly adjacent to each other in the height direction Y and/or in the transverse direction Z of the rack system 10. The rack modules 12-1 and 12-2 are formed of the first rack 14-1 and the second rack 14-2. The racks 14-1 and 14-2 are arranged in the longitudinal direction X of the rack system 10 in parallel to each other and are spaced to each other in the transverse direction Z of the rack system so that the rack aisle 16 is defined between them. The racks 14-1 and 14-2 respectively comprise a plurality of rack compartments 20.

The rack compartments 20 are directly adjacent to each other—with the exception of the escape channel 26—at least in the longitudinal direction X (and typically also in the height direction Y, dependent on the configuration of the rack module 12). The rack modules 12 may comprise one or more rack levels. The rack modules may have different numbers of rack levels.

Each of the rack modules 12-1 and 12-2 comprises a maintenance aisle 32 in the area of the rack aisle 16. This means that the two maintenance aisles 32-1 and 32-2 are arranged vertically on top of each other in the rack aisle 16.

Each of the maintenance aisles 32 is configured to automatically operate one or more storage and retrieval devices 24. This means that the maintenance aisles 32 comply with safety standards, such as being (video and sensor) monitored for allowing detection of the access by the maintenance technician, in order to be able to initiate an emergency shutdown, if necessary, via a safety controller 44, which may also be a component of the rack system 10.

The maintenance aisles 32 are further configured for manual maintenance of the storage and retrieval devices 24 and for trouble shooting. This means that, for example, floors are retracted into the rack aisle 16 to make the rack modules 12 accessible (independently of each other).

The storage and retrieval devices 24 themselves are optional components of the rack system 10 and can be provided by suppliers other than the supplier of the rack.

Within at least one of the racks 14-1 and 14-2 a rack-integrated (compartmentless) escape channel 26 is provided, which connects the maintenance aisles 32 directly to the outside world of the rack system 10 and is configured to be traversed by the maintenance technician. This means that the escape channel 26 is sufficiently large so that the maintenance technician fits through.

In the FIG. 4 the escape channel 26 is exemplarily provided in the first rack 14-1. The escape channel 26 can be provided additionally or alternatively also in the second channel 14-2. In each rack 14 several escape channels 26 can be provided independently of each other.

The escape channel 26 can be formed of escape shafts 28 and/or escape aisles 34.

The connection between the escape channel 26 and the maintenance aisles 32 can take place via one or more doors 42. However, the doors 42 are optional.

The doors 42 are mandatory when the storage and retrieval devices 24 are moved along (guiding) rails 48 that are attached to the sides of the rack compartments 20 rather than (centrally) to the floor and/or ceiling of the maintenance aisle 32. The access to the escape channels 26 is generally from the maintenance aisle 32 in the transverse direction Z into the racks 14.

The number and relative positioning of the escape channels 26 in the racks 14 particularly depends on the length LG of the rack aisle 16 and on the positioning of the lifters 18. Wenn the entrance and/or the exit of the rack aisle 16 is blocked by a (rack-external) lifter 18, more rack-integrated escape channels 26 are required. The rack-external lifters 18 are optional components of the rack system 10.

However, the number of the escape channels 26 does not depend on whether rack-integrated lifters 18 are present. Also, the number of the rack-integrated lifters 18 does not play any role. The rack-integrated lifters 18 only have influence on how the escape channel 26 runs through the corresponding rack 14 since the rack-integrated lifters 18 typically may not be traversed by the escape aisle 34 in the longitudinal direction X. However, when the storage units 22 are stored multiple-deep in the rack compartments 20, sufficient space may be present in the depth of the racks 14 (i.e. in the transverse direction Z) also in the area of the rack-integrated lifters 18, if necessary, in order to lead the maintenance technician horizontally and/or vertically around and behind the rack-integrated lifter 18. This depends on the specific configuration of the racks 14 and on the rack-integrated lifter 18.

Figure 5:
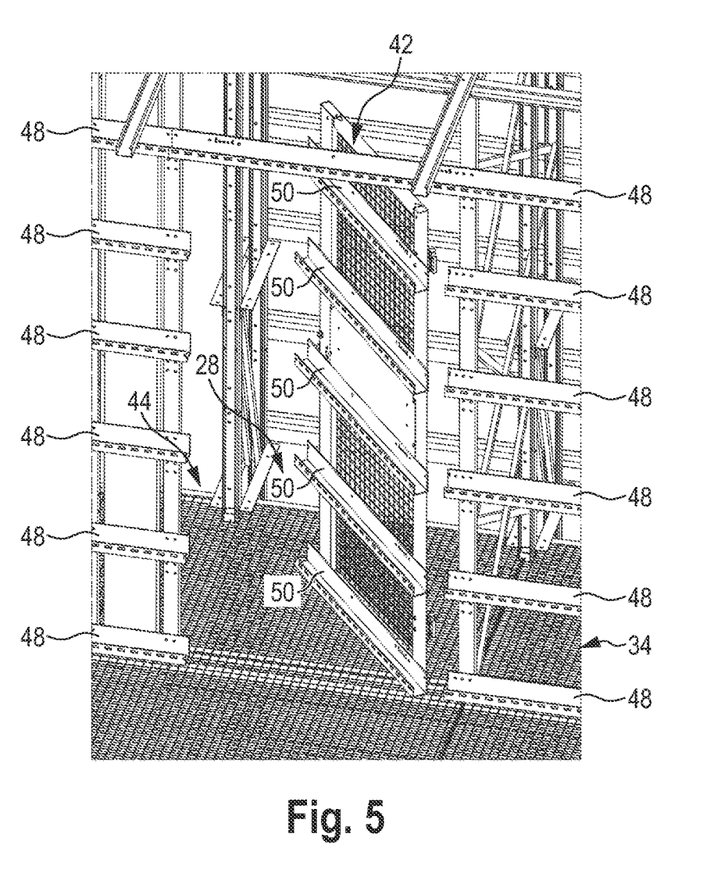
FIG. 5 shows a perspective view into a part of a maintenance aisle comprising a door.

FIG. 5 shows a perspective partial view of a maintenance aisle 32. In particular, a door 42 is shown in FIG. 5 which may be open into the rack 14. Further, floor elements 46 and rails 48 for laterally guiding (not shown, exemplary) one-level storage and retrieval devices (shuttles) 24 in a forced manner are shown. In FIG. 5 six rails 48 are shown on top of each other in the height direction Y. The uppermost rail 48 is formed continuously. The lower five rails 48 are interrupted in the area of the door 42. Subsections 50 of the rails 48 are mounted to the door 42. The subsections 50 are dimensioned and arranged such that the interrupted rails 48, in a closed position of the door 42, are formed almost without interruptions. It is understood that in the end areas of the subsections 50 small gaps relative to the remaining rails 48 may be present. However, this does not disturb the shuttles when passing the door 42.

The door 42 connects the maintenance aisle 32 in the transverse direction Z of the rack system 10 to the compartmentless area of the rack 14. The floor elements 46, which are exemplarily grid-shaped are not only provided in the area of the rack aisle 16 or the maintenance aisle 32, but also within the rack 14. The floor elements 46 within the rack 14 may also extend laterally (in the longitudinal direction X) for providing to the maintenance technician sufficient space for opening and closing the door 42 before the maintenance technician enters the maintenance aisle 32. In case of an escape, the maintenance technician can either ascend or descend via the escape shaft 28 being located, for example, behind the door. Alternatively, the maintenance technician can also escape laterally via a rack-integrated escape aisle 34 leading horizontally to the right in FIG. 5.

The door 42 shown in FIG. 5 includes, beside the subsections 50, a door leaf, which is supported pivotally about a vertical axis, formed of a grid.

Figure 6:
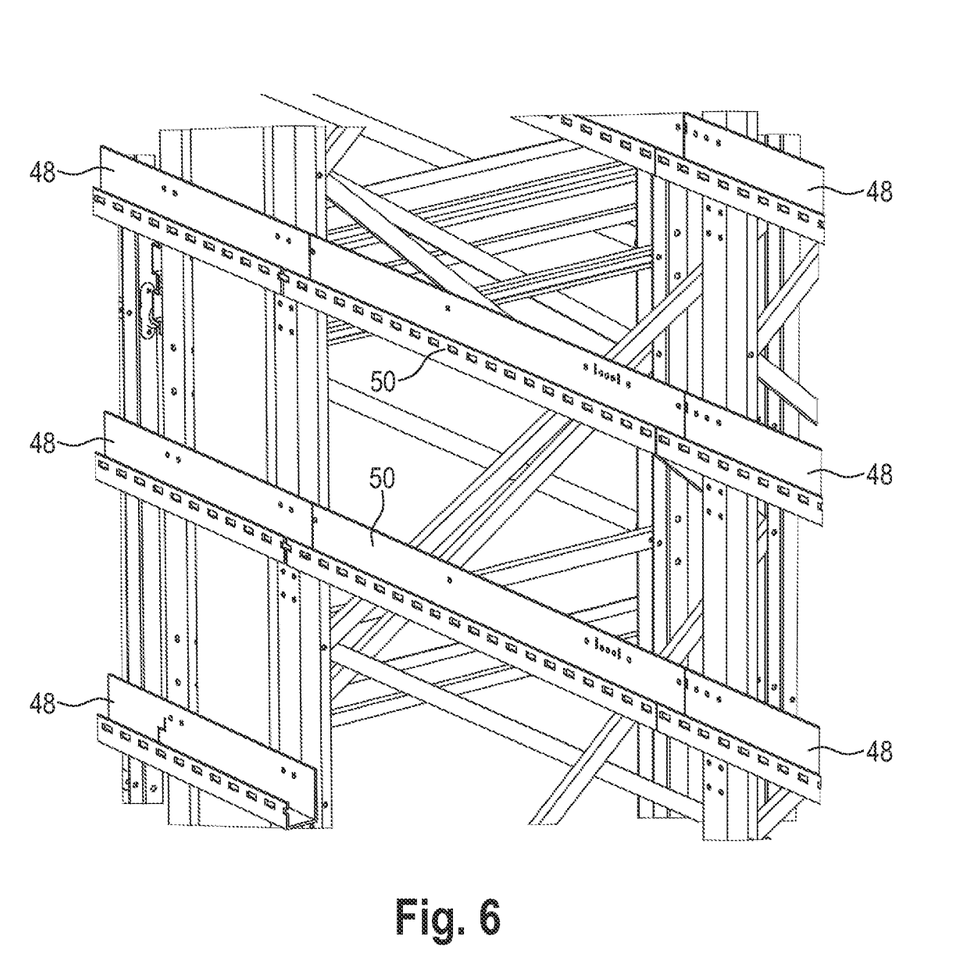
FIG. 6 shows a perspective view of another example of a door.

Alternatively, the door may also be formed by the subsections 50 alone, as exemplarily indicated in FIG. 6. In FIG. 6 the subsections 50 inserted into receiving elements being arranged in the area of the ends of the remaining rails 48. The receiving elements are configured to receive the subsections 50 in a form-fitting manner. In this case, the subsections 50 are manually inserted, or removed, by the maintenance technician. The removal is performed sequentially. Such a configuration of the door 42 is in particular suitable for escape routes which should not be used actually and which are only provided for increasing the safety, because sufficient other escape routes are present.

It is understood that the doors 42 may also be formed alternatively as sliding doors or hinged doors.

If the storage and retrieval device 24 is formed as a multiple-level storage and retrieval device, which is guided along rails arranged in a floor area and ceiling area of the maintenance aisle 32, the doors 42 may be omitted completely. In this case, the escape channels 26 are accessible via openings in the lateral rack surface.

Further, it is understood that safety sensors may be provided in the area of the doors 42 for monitoring whether a corresponding door is in an open or closed position. This information is relevant for the safety controller 44. If the door 42 is in the open position, the storage and retrieval devices 24 of the associated maintenance aisle must be turned off definitely.

LIST OF REFERENCE NUMERALS

10 Rack system
12 Rack module
14 Rack
16 Rack aisle
18 Lifter
20 Rack compartment
22 Storage unit
24 Storage and retrieval device
26 Escape channel
28 Escape shaft
30 Ladder
32 Maintenance aisle
34 Escape aisle
36 Stair tower
38 Connecting bridge
40 Ladder
42 Door
44 Safety controller
46 Ground element
48 Rail
50 Subsection of 48

The invention claimed is:

1. A rack system comprising:
at least two rack modules directly adjacent to each other in a height direction of the rack system;
wherein the rack modules are formed of two racks, which:
are aligned parallel to each other in a longitudinal direction of the rack system and spaced apart from each other in a transverse direction of the rack system for defining a rack aisle between them, and
comprise a plurality of rack compartments, which are directly adjacent to each other;
wherein each of the rack modules comprises, in an area of the rack aisle, a maintenance aisle configured for automatically operating and manually maintaining at least one storage and retrieval device; and
wherein, inside at least one of the racks, a rack-integrated escape channel is provided for connecting the maintenance aisles directly to an outside world of the rack system, and wherein the escape channel is configured to be passed by a maintenance technician, and
wherein the escape channel includes an escape shaft extending in the height direction through the at least one of the racks and connecting to each other the rack modules in the height direction in a compartmentless manner.

2. The rack system of claim 1, wherein the escape channel is defined exclusively by the escape shaft being arranged at a longitudinal end of the at least one of the racks and being connected directly to the outside world at an escape level in the longitudinal direction or in the transverse direction.

3. The rack system of claim 1, wherein the escape shaft is arranged remote to a longitudinal end of the at least one of the racks.

4. The rack system of claim 3, wherein the escape channel is defined exclusively by the escape shaft being connected directly to the outside world at escape level in the transverse direction.

5. The rack system of claim 3, wherein the escape channel further includes an escape aisle extending, at the escape level, in the longitudinal direction between the escape shaft and the outside world, and connecting the escape channel in the longitudinal direction to the outside world.

6. The rack system of claim 1, wherein the rack aisle is longer than a permissible maximum escape-route length.

7. The rack system of claim 1, wherein at one end, or respectively at both ends, of the rack aisle a rack-external lifter is arranged directly so that at least one of storage units and the at least one storage and retrieval device are transportable in the height direction between the rack modules.

8. The rack system of claim 1, wherein at least one rack-integrated lifter is provided in one or both of the racks.

9. A rack system comprising:
at least two rack modules directly adjacent to each other in a height direction of the rack system;
wherein the rack modules are:
formed of two racks, which are aligned parallel to each other in a longitudinal direction of the rack system and spaced apart from each other in a transverse direction of the rack system for defining a rack aisle between them, and
comprise a plurality of rack compartments, which are directly adjacent to each other;
wherein each of the rack modules comprises, in an area of the rack aisle, a maintenance aisle configured for automatically operating and manually maintaining at last one storage and retrieval device; and
wherein, inside at least one of the racks, a rack-integrated escape channel is provided for connecting the maintenance aisles directly to an outside world of the rack system, and wherein the escape channel is configured to be passed by a maintenance technician,
wherein the escape channel includes, in the at least one of the racks, escape aisles only, which extend in the longitudinal direction and connect the respective maintenance aisle directly to the outside world.

10. The rack system of claim 9, further including a stair tower being coupled to the at least one of the racks in the longitudinal direction either directly, or indirectly via a connecting bridge, so that the escape aisles are connected to each other in the height direction.

11. The rack system of claim 9, wherein the rack aisle is no longer than a permissible maximum escape-route length.

12. The rack system of claim 9, wherein at one end, or respectively at both ends, of the rack aisle a rack-external lifter is arranged directly so that at least one of storage units and the at least one storage and retrieval device are transportable in the height direction between the rack modules.

13. The rack system of claim 9, wherein at least one rack-integrated lifter is provided in one or both of the racks.

14. A rack system comprising:
at least two rack modules directly adjacent to each other in a height direction of the rack system;
wherein the rack modules are formed of two racks, which are aligned parallel to each other in a longitudinal direction of the rack system and spaced apart from each other in a transverse direction of the rack system for defining a rack aisle between them, and
comprise a plurality of rack compartments, which are directly adjacent to each other;
wherein each of the rack modules comprises, in an area of the rack aisle, a maintenance aisle configured for automatically operating and manually maintaining at least one storage and retrieval device; and
wherein, within at least one of the racks, a rack-integrated escape channel is provided for connecting the maintenance aisles directly to an outside world of the rack system, and wherein the escape channel is configured to be passed by a maintenance technician,
wherein the at least one storage and retrieval device includes a plurality of shuttles being movable along rails, guided in the longitudinal direction, wherein the rails are attached to the rack compartments in the maintenance aisle in the height direction on top of each other and in the transverse direction at both sides, and extend in the longitudinal direction in the rack aisle, and wherein the escape channel is connected to the maintenance aisle via a door, which includes subsections of the rails.

15. The rack system of claim 14, wherein the door:
consists exclusively of the subsections, which are supportable in end pieces of the respective rail in a manually removable manner;
is slidably supported in the longitudinal direction; or
is rotatably supported about a pivot axis extending along the height direction or the longitudinal direction.

16. The rack system of claim 14, wherein the door is lockable in a closed position, in which the shuttles can pass the door.

17. The rack system of claim 14, wherein a sensor is provided, which monitors a position of the door and outputs a signal to a safety controller when the door is in an open position, wherein the safety controller is configured to deactivate the shuttles within the associated maintenance aisle as soon as the signal is received.

18. The rack system of claim 14, wherein the rack aisle is longer than a permissible maximum escape-route length.

19. The rack system of claim 14, wherein at one end, or respectively at both ends, of the rack aisle a rack-external lifter is arranged directly so that at least one of storage units and the at least one storage and retrieval device are transportable in the height direction between the rack modules.

20. The rack system of claim 14, wherein at least one rack-integrated lifter is provided in one or both of the racks.

* * * * *